US010299122B2

(12) United States Patent
Albanese et al.

(10) Patent No.: US 10,299,122 B2
(45) Date of Patent: May 21, 2019

(54) USER VALIDATION SYSTEM UTILIZING SYMBOLIC OR PICTOGRAPHIC REPRESENTATIONS OF VALIDATION CODES

(71) Applicant: The Parking Genius, Inc., Dallas, TX (US)

(72) Inventors: Antonio Albanese, Dallas, TX (US); George Frederick Baker, Sr., Dallas, TX (US); Del Brown, Duncanville, TX (US); David Livingston, Richardson, TX (US)

(73) Assignee: The Parking Genius, Inc., Dallas, TX (US)

( * ) Notice: Subject to any disclaimer, the term of this patent is extended or adjusted under 35 U.S.C. 154(b) by 225 days.

(21) Appl. No.: 15/360,670

(22) Filed: Nov. 23, 2016

(65) Prior Publication Data

US 2018/0146371 A1    May 24, 2018

(51) Int. Cl.
*G06F 21/44* (2013.01)
*H04L 29/06* (2006.01)
*H04W 12/06* (2009.01)
*H04W 4/021* (2018.01)
*H04W 12/08* (2009.01)

(52) U.S. Cl.
CPC .......... *H04W 12/06* (2013.01); *H04L 63/083* (2013.01); *H04L 63/107* (2013.01); *H04W 4/021* (2013.01); *H04W 12/08* (2013.01); *H04L 2463/081* (2013.01)

(58) Field of Classification Search
CPC .......... H04L 63/08; G06F 21/44; G06F 21/31
See application file for complete search history.

(56) References Cited

U.S. PATENT DOCUMENTS

| 2007/0245158 A1* | 10/2007 | Giobbi | G06F 21/31 |
| | | | 713/186 |
| 2012/0182160 A1 | 7/2012 | Hod | |
| 2012/0246079 A1* | 9/2012 | Wilson | H04L 63/0807 |
| | | | 705/67 |

(Continued)

OTHER PUBLICATIONS

International Search Report and Written Opinion dated Feb. 13, 2018 for International Patent Application No. PCT/US2017/062180, 8 pages.

(Continued)

*Primary Examiner* — Izunna Okeke
(74) *Attorney, Agent, or Firm* — Foley & Lardner LLP

(57) ABSTRACT

Disclosed herein is a device and method for validating users, such as for entry into a given area. The method includes transmitting a plurality of access control tokens from an access control system to a portable device, and detecting proximity a user portable device associated with one of the plurality of access control tokens to the portable device. A symbolic representation of the access control token associated with the user portable device is generated by and displayed on the portable device. Selection of the displayed symbolic representation is accepted at the portable device. The access control system is notified of selection of the displayed symbolic representation, thereby indicating identification of a user associated with the access control token symbolically represented by the symbolic representation. The venue symbolic representation includes at least one pictograph.

22 Claims, 4 Drawing Sheets

(56) References Cited

U.S. PATENT DOCUMENTS

2015/0066607 A1    3/2015   Fiorucci et al.
2015/0117704 A1    4/2015   Bulan et al.
2016/0219012 A1    7/2016   Liao et al.

OTHER PUBLICATIONS

International Search Report and Written Opinion for PCT/US2018/52005 dated Jan. 29, 2019, 7 pages.
Non-Final Office Action on U.S. Appl. No. 15/711,897 dated Jan. 18, 2019.
Notice of Allowance on U.S. Appl. No. 15/711,796 dated Feb. 4, 2019.

\* cited by examiner

USER VALIDATION SYSTEM UTILIZING SYMBOLIC OR PICTOGRAPHIC REPRESENTATIONS OF VALIDATION CODES

TECHNICAL FIELD

This application relates to the validation of users at any location or zone, such as a venue or parking lot, through visual matching of symbolic or pictographic representations of access control tokens of the user.

BACKGROUND

Entry of people, or parking of vehicles, at large venues or other zones, such as sports arenas, can present a variety of challenges. The traffic flow of thousands of vehicles into large zones or parking lots, or of thousands of people into a stadium itself, is difficult to manage, and is made even more so by the verification of parking passes or tickets prior to permitting parking of a vehicle in the parking lot or entry of people into the stadium.

Technology has therefore been developed to help streamline the process. For example, a user may purchase a parking space in advance, and may receive a barcode or QR code to present to an attendant or portable device operator at an entrance of the parking lot. This barcode or QR code may be displayed on a smartphone carried by the user.

The attendant carries a scanning device with which to scan the barcode or QR code to thereby attempt to validate the user for entry into the parking lot. However, such scanning devices must be held in close proximity to the barcode or QR code, requiring the user to open the window of their vehicle and present the smartphone to the attendant. This may result in delay for a variety of reasons. For example, the user may have difficulty accessing the barcode or QR code on the smartphone; the smartphone may turn off its display before the attendant has completed scanning; and/or the smartphone may be held by a passenger not adjacent a window near the attendant. In addition, the mere act of opening the window of the vehicle may be time consuming, or may be undesirable in the case of inclement weather.

Therefore, further development into technology for streamlining the process of selling parking lot access and verifying users prior to entry into the parking lot is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a user validation system that includes an access control system configured to store a plurality of access control tokens associated with a plurality of users, a plurality of user portable devices each configured to store one of the plurality of access control tokens, and a portable device. The portable device is configured to receive at least some of the plurality of access control tokens from the access control system, detect proximity of one or more of the plurality of user portable devices as a function of the access control tokens stored therein, generate and display symbolic representations of the access control tokens of at least some of the detected user portable devices, and accept selection of one of the displayed symbolic representations. The selection indicates identification of a user associated with the access control token symbolically represented by the symbolic representation.

The one or more of the plurality of user portable devices may be configured to generate and display a user symbolic representation of its access control token, and the user symbolic representation may match one of the displayed symbolic representations. The portable device may generate the venue symbolic representations according to a scheme under which each unique access control token is represented by one unique symbolic representation associated only with that unique access control token. The one or more of the user portable devices may generate the user symbolic representation according to the scheme. The symbolic representations and user symbolic representation are not barcodes or QR codes, but may instead be pictographs or symbols. At least one of the plurality of access control tokens may be a numerical representation of a bar code or QR code.

One or more of the plurality of user portable devices may include a geolocation module capable of determining a geolocation of such user portable device, such user portable device being configured to attempt communications with the portable device based upon detection of entry to a given geofenced location by the geolocation module.

The portable device may include a first wireless communication module. One or more of the plurality of user portable devices may include a second wireless communication module capable of communication with the first wireless communication module, such user portable device being configured to attempt communications with the portable device based upon detection of signals from the first wireless communications module, using the second wireless communications module.

One or more of the plurality of user portable devices may include a geolocation module capable of determining a geolocation of such user portable device, such user portable device being configured to prompt its user to execute a user application based upon detection of entry to a given geofenced location by the geolocation module. Such user portable device, while executing the user application, may be configured to attempt communications with the portable device. Such user portable device, while executing the user application, may be configured to request association of its user with an access control token. The access control system may be configured to effectuate the association of the user of such user portable device with the access control token and to store the access control token as one of the plurality of access control tokens. The portable device may be configured to receive the access control token from the access control system and to transmit the access control token to the user portable device. The access control system may be configured to transmit the access control token to the user portable device.

The portable device may include a first wireless communication module, and one or more of the plurality of user portable devices may include a second wireless communication module capable of communication with the first wireless communication module, such user portable device being configured to prompt its user to execute a user application based upon detection of signals from the first wireless communications module via the second wireless communications module. Such user portable device, while executing the user application, may be configured to attempt communications with the portable device. Such user portable device, while executing the user application, may be configured to request association of its user with an access control token, and the access control system may be configured to effectuate the association of the user of such user portable device with the access control token and to store the access control token as one of the plurality of access control tokens. The portable device may be configured to receive the access control token from the access control system and to transmit the access control token to the user portable device. The access control system may be configured to transmit the access control token to the user portable device.

The portable device may be further configured to attempt validation of the access control token symbolically represented by the selected symbolic representation and the user symbolic representation, and to display a result of the attempted validation. The portable device may attempt validation of the access control token symbolically represented by the symbolic representation by determining whether a given permission is associated with such access control token. The given permission may be permission to enter a given area or permission to park a vehicle in a given area. The portable device may notify the access control system of validation of such access control token, indicating validation of the user associated with such access control token.

Also disclosed herein is a method aspect. The method may include transmitting a plurality of access control tokens from an access control system to a portable device, and detecting proximity a user portable device associated with one of the plurality of access control tokens to the portable device. The method may also include generating and displaying a symbolic representation of the access control token associated with the user portable device, on the portable device, accepting selection of the displayed symbolic representation, at the portable device, and notifying the access control system of selection of the displayed symbolic representation, thereby indicating identification of a user associated with the access control token symbolically represented by the symbolic representation. The symbolic representation includes at least one pictograph.

The method may further include generating and displaying a user symbolic representation of the access control token associated with the user portable device, on a display of the user portable device. Selection may be performed as a function of the displayed user symbolic representation matching the displayed symbolic representation, and the pictograph is not a barcode or QR code.

The symbolic representation may be generated by the portable device according to a scheme under which each unique access control token is represented by one unique symbolic representation associated only with that unique access control token, and the user symbolic representation may be generated by the user portable device according to the scheme.

The method may also include prompting the user of the user portable device to execute a user application on the user portable device as a function of proximity to the portable device.

Pursuant to execution of the execution of the user application, association of the user portable device with the access control token may be requested by the user portable device. In addition, the association of the user portable device with the access control token may be effectuated by the portable device or the access control system. The access control token may be stored in the user portable device, portable device, and access control system.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
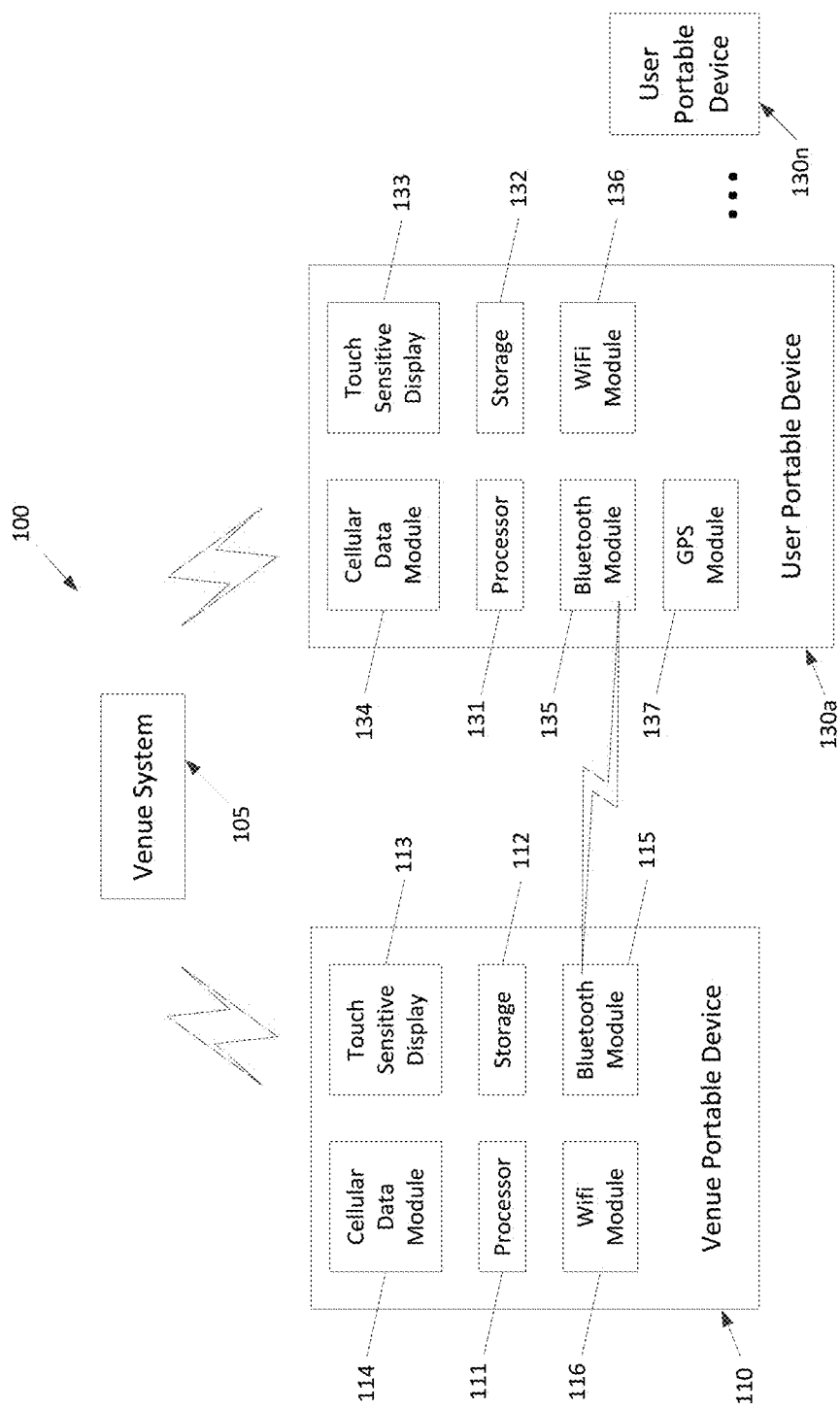
FIG. 1 is a block diagram of a user validation system in accordance with this disclosure.

With initial reference to FIG. 1, a user validation system 100 is now described. Before beginning, it should be understood that the user validation system 100 may be used for validating users for any purpose. For example, the system 100 may be used to validate a user for entry into any given area such as a zone, building, parking lot, or other area, validate a user for entry into a zone or venue arena itself, validate a user for entry into a portion of a zone or venue arena, etc. In some cases, the system 100 may be used to simply validate that a user is of a certain age, or to validate the identity of the user.

Turning now to specifics of the system 100, the user validation system 100 includes an access control system 105, at least one portable device 110, and multiple user portable devices 130a-130n. It should be understood that although one access control system 105 is shown, there may be any number of access control systems 105, and the owner of one or more of the access control systems 105 may or may not be the same as the owner of the user validation system 100.

Each piece of the system 100 will first be described, and then the functionality of the system 100 as a whole will be described.

The access control system 105 may be a local server, local computer, cloud server, cloud computer, or larger cloud based infrastructure with multiple servers. In some cases the access control system 105 may actually be one with the portable device 110, or may be a separate process or virtual machine running on the portable device 110. The access control system 105 is capable of communication with a wide area network (e.g. the Internet), and/or a local area network.

The portable device 110 may be a smartphone, tablet, or other specialized device. The portable device 110 includes a processor 111 coupled to data storage 112 for data storage, a touch sensitive display 113 for input and output, a cellular data module 114 for cellular data communications with the Internet, a bluetooth module 115 for direct wireless data communications with the user portable devices 130a-130n, and a WiFi module 116 for communication with a local area network. Some of these elements of the portable device 110 need not be present, such as the cellular data module 114. In addition, the bluetooth module 115 may instead be a module for communicating via any personal area network or short range wireless network. Further, it should be understood that some of these elements may be integrated together within a system on a chip.

There may be any number of user portable devices 130a-130n, although for brevity, just the user portable device 130a will be described in detail. The user portable device 130a may be a smartphone, tablet, smartwatche, or any other form of carryable or wearable electronic device. The user portable device 130a includes a processor 131 coupled to data storage 132 for data storage, a touch sensitive display 133 for input and output, a cellular data module 134 for cellular data communications with the Internet, a bluetooth module 135 for direct wireless data communications with the portable device 110, a GPS module 137 for determining the geolocation of the user portable device itself, and a WiFi module 136 for communication with a local area network. Some of these elements of the user portable device 130a need not be present, such as the cellular data module 134. In addition, the bluetooth module 165 may instead be a module for communicating via any personal area network or short range wireless network. Further, it should be understood that some of these elements may be integrated together within a system on a chip.

Figure 2:
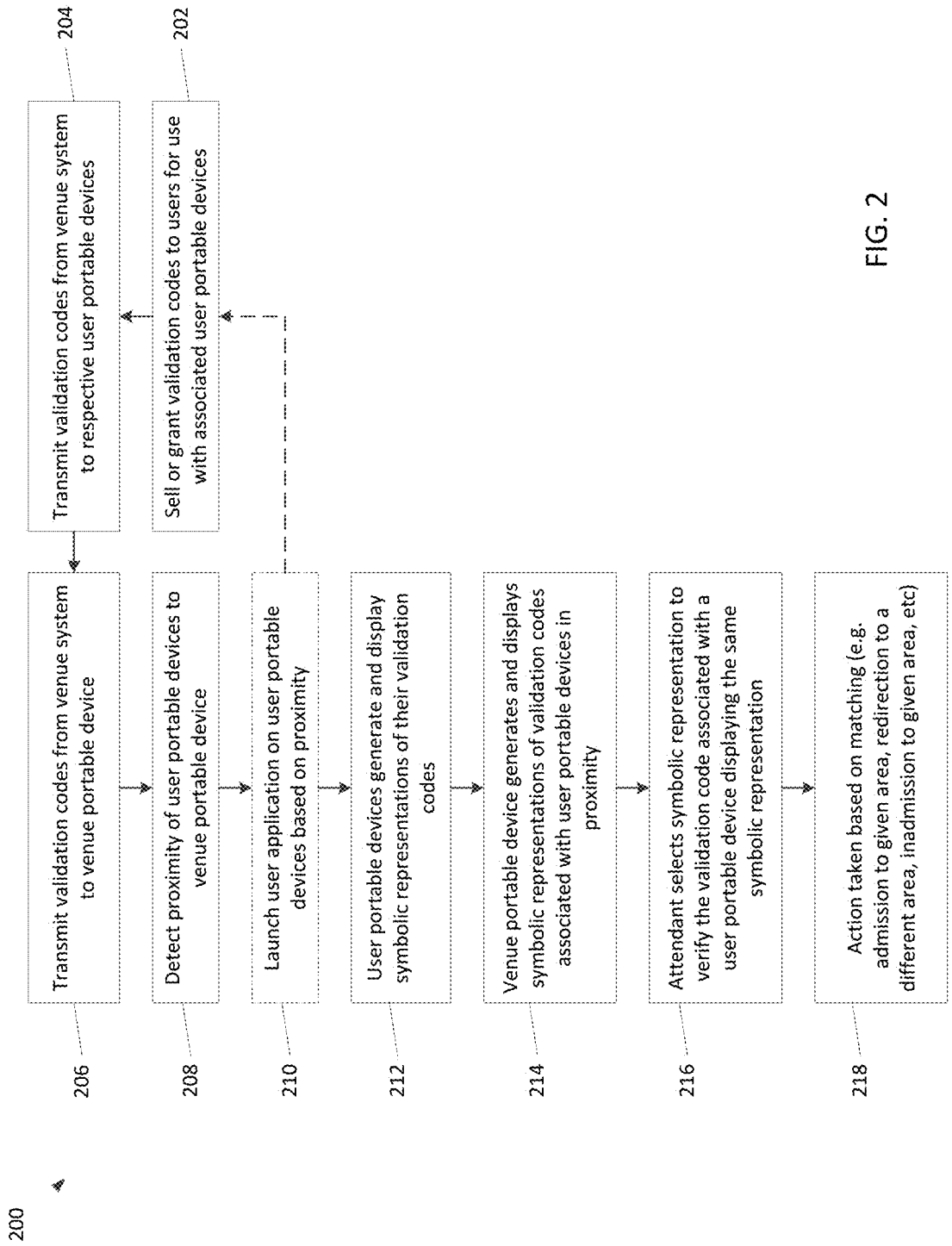
FIG. 2 is a flowchart of operation of the user validation system of FIG. 1.

Operation of the system 100 will now be described with further reference to FIG. 2. The system 100 operates to sell or grant access control tokens to users. This may take place on the fly as a user carrying the user portable device 130a seeks entry to a given area or zone (e.g. as a user pulls into a parking lot), prior to the user seeking entry to the given area or zone (e.g. where the user pre-purchases parking for an event at the venue), or both. Where the selling or granting of the access control token is performed prior to the user seeking entry to the given area or zone, the access control system 105 functions to sell or grant the access control tokens to users for use with their associated user portable devices 130a-130n (Block 202), and then transmits those access control tokens to the user portable devices 130a-130n (Block 204). The access control system 105 then transmits the access control tokens to the portable device 110 (Block 206), over the Internet or over a LAN.

The portable device 110 broadcasts its service and characteristic. The user portable devices 130a-130n, at the appropriate time, then scan for devices broadcasting the expected service and characteristic, and therefore establish wireless communications with the portable device 110 in this manner. After an initial bluetooth handshake between the portable device 110 and the user portable devices 130a-130n in proximity, the user portable devices 130a-130n each broadcast the access control tokens stored in their respective storages 132 to the portable device 110 via their respective bluetooth modules 135. The portable device 110 then receives the transmitted access control tokens and stores them in its storage 112. From receipt of the access control tokens, the portable device 110 detects proximity of one or more of the user portable devices 130a-130n (Block 208).

In some cases, the user portable devices 130a-130n may attempt to initiate the communications with the portable device 110 based on proximity thereto as determined by detecting signals transmitted thereby, or based upon proximity to the venue itself (e.g. entry into a geofenced location including the venue) as determined using the GPS module 137.

In the case where one or more of the user portable devices 130a-130n is used to request or purchase an access control token as the user seeks entry to the venue, a user application is launched on those user portable devices (Block 210), either automatically based on detection of proximity to the portable device 110 via the bluetooth module 135 or based on detection of proximity to the venue itself (e.g. entry into a geofenced area including the venue) via the GPS module 137, or manually via user input received on the touch screen 133. The user input may be in response to display of a notification on the touch screen 133 asking the user to launch the user application. This notification may be displayed based on detection of proximity to the portable device 110 via the bluetooth module 135 or based on detection of the proximity to the venue itself via the GPS module 137.

The requesting user portable devices 130a-130n make the request to the access control system 105 over the WAN or LAN, and the access control system 105 then sells or grants the access control token to users for use on those user portable devices 130a-130n (Block 202), transmits the access control tokens to those user portable devices 130a-130n (Block 204), and then transmits the access control tokens to the portable device 110 (Block 206). As an alternative, the access control system 105 may not send the purchased or granted access control token to the requesting user portable devices 130a-130n, and instead, the portable device 110 may send the purchased or granted access control token to the user portable devices 130a-130n via its bluetooth module 115.

Figure 4:
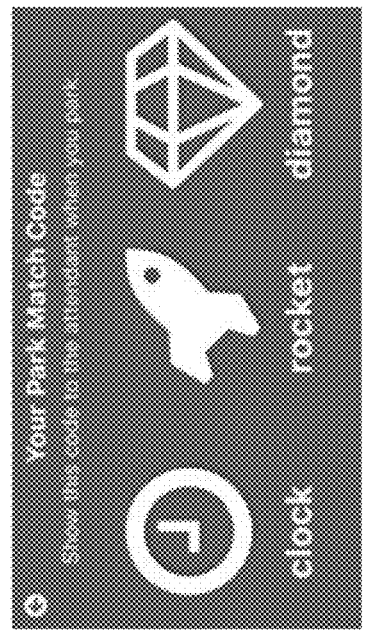
FIG. 4 is a sample display of a user application in execution on one of the user portable devices of FIG. 1.

The user portable devices 130a-130n, either automatically in response to proximity with the portable device 110 or proximity with the venue itself, or in response to user input, generate and display symbolic representations of the access control tokens in their storages 132 (Block 212). A sample display of such a symbolic representation is shown in FIG. 4.

Figure 3:
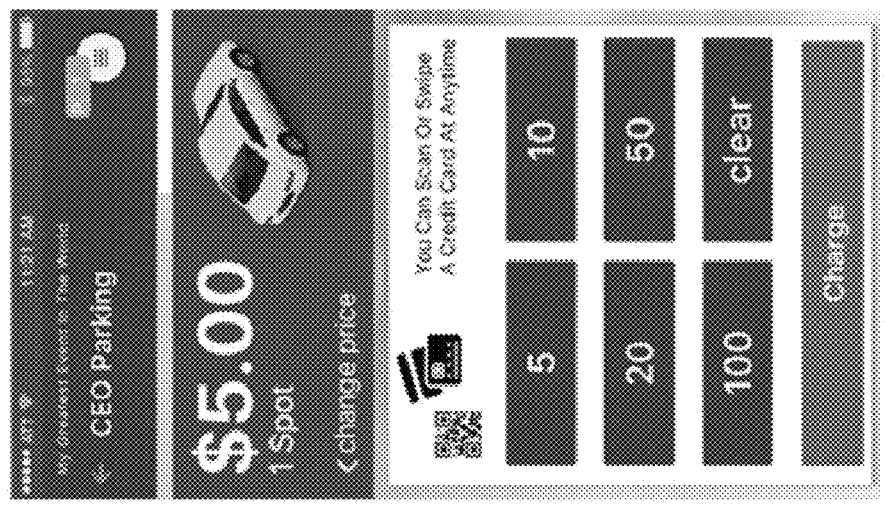
FIG. 3 is a sample display of an application in execution on the portable device of FIG. 1.
Figure 5:
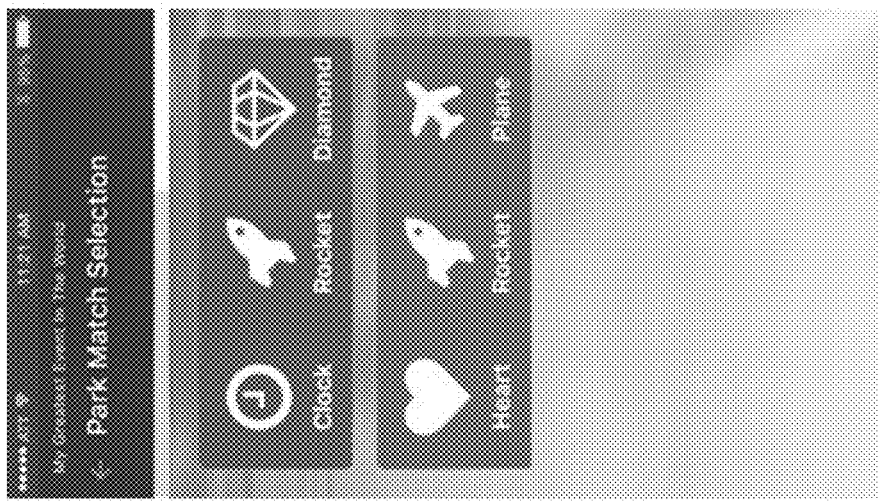
FIG. 5 is another sample display of an application in execution on the portable device of FIG. 1.

The portable device 110 receives the broadcasted access control tokens from the user portable devices 130a-130n within proximity thereto, and attempts to match or validate those access control tokens by communicating them to the access control system 105. If communications with the access control system 105 cannot be established, other access control systems may be contacted to attempt validation. If communication cannot be established with any of the access control systems 105 (provided there are multiple such access control systems) then the portable device 110 matches the broadcasted access control tokens to the access control tokens stored in its storage 112. Regardless of how matching of validation occurs, the portable device 110 then generates and displays symbolic representations of at least some of the access control tokens (Block 214). This display, or a related display, may include a badge to provide a visual clue to the portable device operator that user portable devices 130a-130n are nearby and broadcasting their access control tokens, as shown in FIG. 3. The display of two different symbolic representations for selection on the display 113 of the portable device 110 is shown in FIG. 5. The symbolic representations are displayed in order of the recentness of communication, that is, the symbolic representation at the top of the list is the symbolic representation associated with the verification code sent by the user portable device 130a-130n that most recently communicated with the portable device 110. In addition, where a predetermined period of time has elapsed, such as five minutes, without additional communications received from a user portable device 130a-130n, the symbolic representation of that verification code may be removed from display by the portable device 110.

The portable device 110 and the user portable devices 130a-130n utilize the same scheme of converting or translating the access control tokens into the symbolic representations such that the same access control token at each device results in the same symbolic representation being generated by each device.

While these symbolic representations will be described in greater detail below, they should be understood to be symbolic or pictographic in nature, and not barcodes or QR codes. Such symbols or pictographs are easy for the human eye of a portable device operator carrying the portable device 110 to recognize and match, whereas the human eye has difficulty differentiating one barcode or QR code from another.

Figure 6:
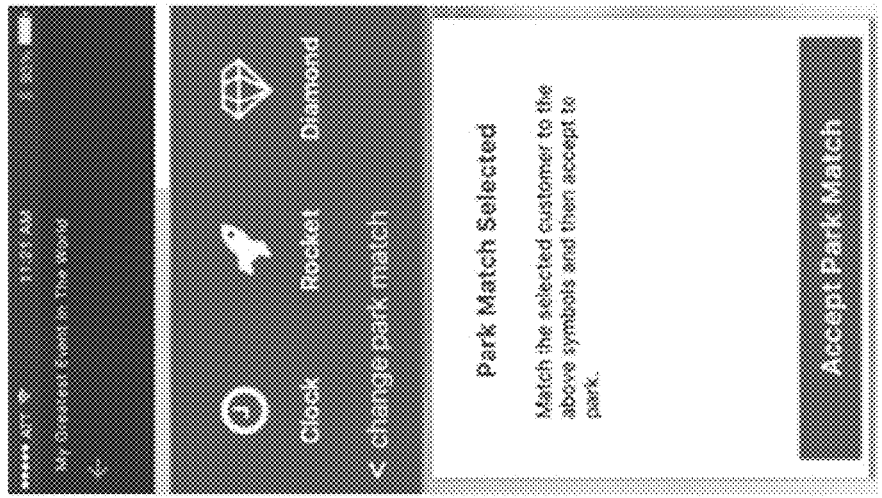
FIG. 6 is a further sample display of an application in execution on the portable device of FIG. 1.

The portable device operator, with the aid of the symbolic representations, quickly matches the symbolic representation shown on the display 133 of a user portable device 130*a* to a corresponding symbolic representation shown on the display 113 of the portable device 110, and selects that symbolic representation on the display 113 of the portable device 110 (Block 216). This selection on the display 113 of the portable device 110 is shown in FIG. 6. Selection results in the removal of the symbolic representation from the list.

This verifies the identity of the user of the user portable device 130*a*, and action may then be taken based upon that verification (Block 218). For example, the portable device 110 may communicate the verification of the user to the access control system 105, indicating that the user of the user portable device 130*a* has used the verification code. The access control system 105 may use this information to track available parking spaces, available seats, occupancy of a given area, etc. The portable device operator may permit or direct the user of the user portable device 130*a* to enter the given area.

In some cases, when the verification of the user is sent to the access control system 105, the access control system may determine that the user should not be permitted to enter the given area, or that the user is attempting to enter an incorrect area and should be redirected to a proper area, and sends notification of such to the portable device operator via the portable device 110. The access control system 105 may also determine that the access control token represented by the symbolic representation is invalid, or has already been claimed, and send notification of such to the portable device operator via the portable device 110.

Generation of the symbolic representations of the access control tokens will now be discussed. In this example discussed, the access control token is the numerical representation of a barcode, but the symbolic representations may be generated for any sort of access control token. The access control token is first split into N parts, with N being equal to a desired number of symbols to be presentation the symbolic representations of the access control tokens. For example, in the sample validations codes shown in FIGS. 4-6, there are three symbols, so N is equal to three.

Where the barcode is used, each of the N parts is a number, although where another type of code (e.g. alphanumeric code) is used, each of the N parts is converted into a number. The number of each of the N parts is then modulo divided by a total number of symbols in an ordered set of pre-selected symbols. The result of the modulo divide is the remainder of the divide, the the symbol displayed for each of the N parts is based upon that remainder.

As an example, where N is equal to three, and the set of pre-selected symbols includes 25 symbols, the total number of permutations of the symbols is 13,800. However, if the background color upon which the symbolic representation is presented is also selected as a function of one of the N parts, the total number of permutations of the symbols increases to 130,800. Therefore, in some applications, the background color upon which the symbolic representation is presented is selected as a function one of the N parts, such as the first part. In some cases, the set may contain more (or less) than 25 symbols. In addition, each symbol could have its own foreground color, with a background color common to each symbols. Still further, each symbol could have its own foreground color as well as its own background color.

The symbols themselves may be taken from icon fonts, for example. Any such icon front, including custom icon fonts, may be used. The symbols also may be taken from emoji character sets, also referred to as "smileys".

In display, the first symbol of each symbolic representation may be larger than the other symbols of that symbolic representation, to help draw the attention of the human eye thereto, and thus to help further increase the quickness by which an portable device operator can match the symbolic representations.

Any displays or notifications described above relative to the portable device 110 and user portable devices 130*a*-130*n* may be delivered in the form of notifications, popups, displays on active applications, or toasts.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A user validation system comprising:
an access control system configured to transmit a first access control token from the access control system for receipt by a first user portable device and a second access control token from the access control system for receipt by a second user portable device;
a portable device having a wireless transceiver and configured to detect, by the wireless transceiver of the portable device, proximity of the first user portable device and proximity of the second user portable device to the portable device;
the portable device further configured to receive, via the wireless transceiver of the portable device, the first access control token from the first user portable device and the second access control token from the second user portable device;
a portable device processor and a portable device display of the portable device, the processor and display interoperable to generate and display a first symbolic representation of the first access control token on the display and a second symbolic representation of the second access control token on the display;
the display having a touch sensitive component to accept a selection of the displayed first symbolic representation by an operator of the portable device, the selection corresponding to a grant of access to the first user of the first user portable device having a matching display of the first symbolic representation of the first access control token on a separate screen thereof for visual inspection by the operator of the portable device.

2. The user validation system of claim 1, wherein the portable device generates the symbolic representations according to a scheme under which each unique access control token is represented by one unique symbolic representation associated only with that unique access control token; and wherein the symbolic representations and user symbolic representation are not barcodes or QR codes.

3. The user validation system of claim 1, wherein the first and second access control tokens are each a numerical representation of a bar code or QR code.

4. The user validation system of claim 1, comprising the first user portable device and the second user portable device, wherein each of the first user portable device and the second user portable device includes a geolocation module capable of determining a geolocation of such user portable device, such user portable device being configured to attempt communications via the wireless transceiver, with the portable device based upon detection of entry to a given geofenced location by the geolocation module.

5. The user validation system of claim 1, comprising the first user portable device and the second user portable device, wherein each of the first user portable device and the second user portable device includes a geolocation module capable of determining a geolocation of such user portable device, such user portable device being configured to prompt its user to execute a user application based upon detection of entry to a given geofenced location by the geolocation module.

6. The user validation system of claim 5, wherein such user portable device, while executing the user application, is configured to attempt communications with the portable device.

7. The user validation system of claim 5, wherein such user portable device, while executing the user application, is configured to request association of its user with an access control token; wherein the access control system is configured to effectuate the association of the user of such user portable device with an access control token and to store such association.

8. The user validation system of claim 1, wherein the access control system transmits the first access control token from the access control system for receipt by the first user portable device via the portable device which receives the access control token from the access control system and transmits the first access control token for receipt by the first user portable device.

9. The user validation system of claim 1, wherein the portable device includes a first wireless communication module; and wherein one or more of the first and second user portable devices includes a second wireless communication module capable of communication with the first wireless communication module, such one or more of the first and second user portable device being configured to prompt its user to execute a user application based upon detection of signals from the first wireless communications module via the second wireless communications module.

10. The user validation system of claim 9, wherein such one or more of the first and second user portable device, while executing the user application, is configured to attempt communications with the portable device.

11. The user validation system of claim 9, wherein such one or more of the first and second user portable device, while executing the user application, is configured to request association of its user with an access control token; wherein the access control system is configured to effectuate the association of the user of such user portable device with the access control token and to store the access control token as one of the plurality of access control tokens.

12. The user validation system of claim 11, wherein the access control system transmits the first access control token from the access control system for receipt by the first user portable device via the portable device which receives the access control token from the access control system and transmits the first access control token for receipt by the first user portable device.

13. The user validation system of claim 1, wherein the portable device is further configured to attempt validation of the first access control token symbolically represented by the selected first symbolic representation, and to display a result of the attempted validation.

14. The user validation system of claim 13, wherein the portable device attempts validation of the first access control token symbolically represented by the selected first symbolic representation by determining whether a given permission is associated with the first access control token.

15. The user validation system of claim 14, wherein the given permission comprises permission to enter a given area or permission to park a vehicle in a given area.

16. The user validation system of claim 14, wherein the portable device notifies the access control system of validation of the first access control token, indicating validation of the user associated with the first access control token.

17. A method comprising:
    transmitting a first access control token from an access control system to a first user portable device and a second access control token from the access control system to a second user portable device;
    detecting, by a wireless transceiver of a portable device, proximity of the first user portable device and proximity of the second user portable device to the portable device;
    receiving, by the portable device via a wireless connection to the first user portable device, the first access control token from the first user portable device;
    receiving, by the portable device via a wireless connection to the second user portable device, the second access control token from the second user portable device;
    generating and displaying, on the portable device, a first symbolic representation of the first access control token associated with the first user portable device;
    generating and displaying, on the user portable device, a second symbolic representation of the second access control token associated with the second user portable device;
    generating and displaying, on the first user portable device, the first symbolic representation of the first access control token associated with the first user portable device;
    generating and displaying, on the second user portable device, the second symbolic representation of the second access control token associated with the second user portable device;
    accepting selection of the displayed first symbolic representation and not the displayed second symbolic representation, at the portable device, the selection corresponding to a grant of access to a first user of the first user portable device and not to a second user of the second user portable device; and
    notifying the access control system of selection of the displayed first symbolic representation, thereby indicating identification of the first user associated with the first access control token symbolically represented by the first symbolic representation;
    wherein the displayed first symbolic representation includes at least one pictograph displayed on the portable device corresponding to a matching display of the first symbolic representation including the at least one pictograph displayed on the first user portable device proximate to the portable device.

18. The method of claim 17, wherein the pictograph is not a barcode or QR code.

19. The method of claim 17, wherein the symbolic representation is generated by the portable device according to a scheme under which each unique access control token is represented by one symbolic representation associated with that unique access control token.

20. The method of claim 17, wherein the symbolic representation is generated by the portable device according to a scheme under which each unique access control token is represented by one unique symbolic representation associated only with that unique access control token.

21. The method of claim 17, further comprising prompting the user of the first user portable device to execute a user application on the first user portable device as a function of proximity to the portable device.

22. The method of claim 21, further comprising:
pursuant to execution of the user application, requesting association of the first user portable device with the first access control token, by the first user portable device;
effectuating the association of the first user portable device with the first access control token, by the portable device or the access control system; and
storing the first access control token in the first user portable device, the portable device, and the access control system.

* * * * *